(12) United States Patent
Ozaki et al.

(10) Patent No.: US 7,297,300 B2
(45) Date of Patent: Nov. 20, 2007

(54) METHOD OF MAKING POLARIZABLE ELECTRODE FOR ELECTRIC DOUBLE LAYER CAPACITOR

(75) Inventors: Kouki Ozaki, Aichi (JP); Masanori Tsutsui, Aichi (JP); Manabu Iwaida, Saitama (JP); Shigeki Oyama, Saitama (JP); Kenichi Murakami, Saitama (JP)

(73) Assignees: Daido Metal Company Ltd., Aichi (JP); Honda Motors Co. Ltd., Tokyo (JP)

( * ) Notice: Subject to any disclaimer, the term of this patent is extended or adjusted under 35 U.S.C. 154(b) by 178 days.

(21) Appl. No.: 10/724,359

(22) Filed: Dec. 1, 2003

(65) Prior Publication Data
US 2004/0164440 A1   Aug. 26, 2004

(30) Foreign Application Priority Data
Nov. 29, 2002  (JP) ............................. 2002-347937
Nov. 29, 2002  (JP) ............................. 2002-347938

(51) Int. Cl.
*C04B 35/00*   (2006.01)

(52) U.S. Cl. ........................ 264/105; 162/138; 264/175

(58) Field of Classification Search ................ 162/138; 252/567; 429/129, 247; 131/365; 361/502, 361/324; 264/105, 175
See application file for complete search history.

(56) References Cited

U.S. PATENT DOCUMENTS 5,277,729 A * 1/1994 Endo et al. ................. 156/157

FOREIGN PATENT DOCUMENTS

| JP | 02-235320 | * | 9/1996 |
| JP | 2000-277391 | * | 10/2000 |
| JP | 2000-277391 A | | 10/2000 |

OTHER PUBLICATIONS

Patent Abstracts of Japan, 2001-307964, Nov. 2, 2001, NGK Insulators Ltd.

* cited by examiner

*Primary Examiner*—Mark Halpern
(74) *Attorney, Agent, or Firm*—Browdy and Neimark, PLLC

(57) ABSTRACT

A method of making a polarizable electrode for an electric double layer capacitor, includes adding a binder assistant to a binder so that the binder is swollen and mixing a carbonaceous powder, a conductive assistant and thereafter the swollen binder, thereby obtaining a material mixture, kneading the material mixture into a primary forming material, forming the primary forming material into a secondary forming material, and rolling the secondary forming material into a sheet shape.

7 Claims, 4 Drawing Sheets

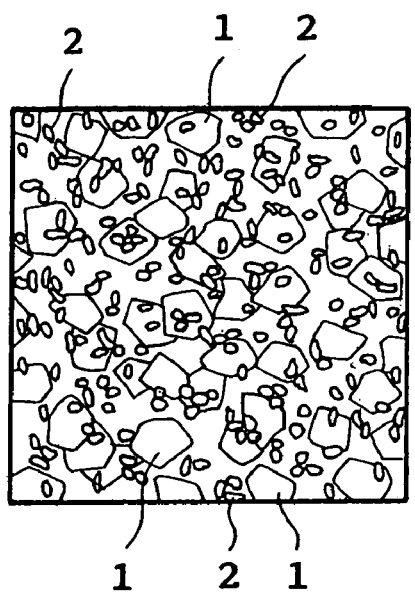
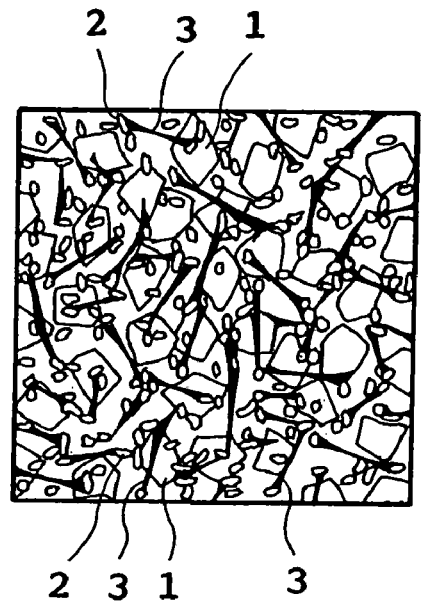
FIG. 2A  FIG. 2B
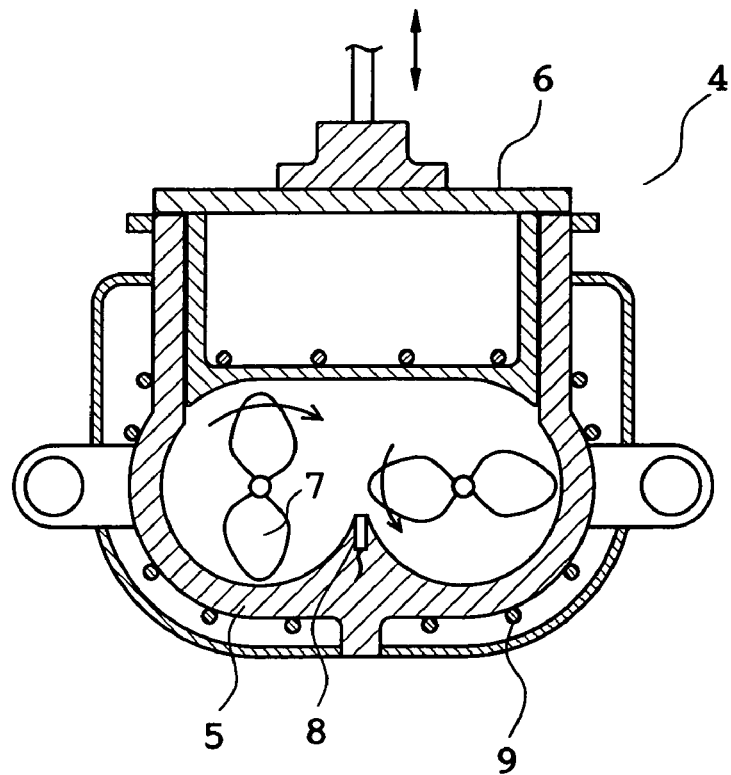
FIG. 3

METHOD OF MAKING POLARIZABLE ELECTRODE FOR ELECTRIC DOUBLE LAYER CAPACITOR

The application claims foreign priority based on related applications 2002-347937 and 2002-347938, filed in Japan on Nov. 29, 2002.

BACKGROUND OF THE INVENTION

1. Field of the Invention

This invention relates to a method of making a sheet polarizable electrode for an electric double layer capacitor from a material containing a carbon powder, a conductive assistant and a binder.

2. Description of the Related Art

Electric double layer capacitors have a large capacity and an excellent charge and discharge cycle property. Therefore, the electric double layer capacitors are used for the purposes of backup power supplies for various electronic devices and batteries for means of transportation such as automobiles. Alternatively, applications of the electric double layer capacitors to the aforesaid appliances have been under examination. Particularly when used as batteries for transportation means such as automobiles, the electric double layer capacitor is required to have a large electrostatic capacity or capacitance. A long sheet polarizable electrode is required in such an electric double layer capacitor as having a large electrostatic capacity. Various methods have been proposed for making a long sheet polarizable electrode.

JP-A-2001-307964 discloses the following method of making a sheet polarizable electrode for an electric double layer capacitor, for example. Firstly, an aqueous solution made by mixing isopropyl alcohol with demineralized water is added to activated carbon to be mixed together by a mixer. Carbon black and fluorocarbon resin are then added to the obtained mixture to be further mixed together by the mixer, whereupon a material or a mixture is obtained. The mixture is then kneaded by a kneader. The kneaded material is dried and thereafter, pulverized so that a grain diameter is not more than 2 mm. The pulverized grain is rolled between parallel rollers into a sheet-shape. The obtained sheet polarizable electrode has an average thickness of about 200 μm and a density of 0.70 g/cm$^3$.

In the foregoing method, however, the material cannot be distributed uniformly in the mixing step such that a failure is easy to occur in the mixing. Upon occurrence of a failure in the mixing, the material cannot be distributed uniformly in the kneading step, either. As a result, when the material is formed or rolled into a sheet shape, segregation tends to easily occur in the material. Upon occurrence of segregation, the effect of a binder becomes unstable, whereupon ends of a formed sheet are cracked, or cavity or the like occurs in the formed sheet. Consequently, the quality of the formed sheet is unstable and a necessary strength cannot be obtained.

SUMMARY OF THE INVENTION

Therefore, an object of the present invention is to provide a method of making a polarizable electrode for an electric double layer capacitor, which method can prevent failure in the mixing of the materials and stabilize the quality and strength of the sheet polarizable electrode.

The inventors conducted various experiments regarding mixture of materials and achieved the following results:

Firstly, the method disclosed in the above-mentioned Japanese gazette has a difficulty in uniformly mixing a plurality of types of materials. In this method, activated carbon and carbon black both serving as major components are put into a mixer together with fluorocarbon resin and a solvent (binder assistant) of the fluorocarbon resin to be mixed together. The inventors of the present invention supposed that putting a plurality of types of materials into the mixer once prevented uniform mixing. Then, activated carbon and carbon black were firstly put into the mixer to be mixed and thereafter fluorocarbon resin and solvent were put into the mixer and mixed. Consequently, a plurality of types of the above-described materials were able to be mixed uniformly.

Secondly, contact between a binder assistant and a binder is difficult when the binder assistant is put into the mixer together with carbonaceous powder, conductive assistant and binder once and mixed. As a result, fibrillating the binder becomes difficult and accordingly, mixing cannot be carried out sufficiently. In view of this problem, a solvent was added to the fluorocarbon resin prior to mixing the materials so that the fluorocarbon resin was swollen. The materials were uniformly mixed when the swollen fluorocarbon resin was put into the mixer with activated carbon and carbon black thereby to be kneaded.

Consequently, a plurality of types of materials were found to be uniformly mixed either when fluorocarbon resin and solvent were added and mixed after mixing of activated carbon and carbon black or when previously swollen fluorocarbon resin was mixed with activated carbon and carbon black. The present invention was made based on the finding.

The present invention provides a method of making a polarizable electrode for an electric double layer capacitor, comprising adding a binder assistant to a binder so that the binder is swollen and mixing a carbonaceous powder, a conductive assistant and thereafter the swollen binder, thereby obtaining a material mixture, kneading the material mixture into a primary forming material, kneading the material mixture into a primary forming material, forming the primary forming material into a secondary forming material, and rolling the secondary forming material into a sheet shape.

The binder becomes easy to fibrillate when the binder assistant is previously added to the binder so that the binder is preferentially swollen. The materials are desirably mixed when the aforesaid binder is added to the carbonaceous powder and conductive assistant. Accordingly, the subsequent kneading, forming and rolling steps can easily be carried out. Furthermore, the strength of the sheet polarizable electrode can be improved, and swell, crack in ends and cavity or the like can be reduced in the sheet polarizable electrode.

The present invention also provides a method of making a polarizable electrode for an electric double layer capacitor, comprising a mixing step including a primary mixing in which a carbonaceous powder and a conductive assistant are mixed into a primary mixture, and a secondary mixing in which. a binder and a binder assistant are added to the primary mixture to be mixed into a material mixture; a kneading step in which the material mixture is kneaded into a clayey forming material; a forming step in which the clayey forming material is formed into a fine grain state and thereafter into a sheet of forming material; and a rolling step in which the sheet of forming material is rolled into a thinner sheet shape.

In the mixing of the materials, only the carbonaceous powder and conductive assistant are firstly mixed. Accordingly, the carbonaceous powder and conductive assistant are uniformly distributed in the resultant primary mixture.

When the binder is added to the primary mixture, three materials are distributed as uniformly as possible. Consequently, failure in mixing the materials can be prevented. Since the mixing is carried out desirably, the subsequent kneading, forming and rolling can easily be carried out. Consequently, a sheet polarizable electrode with reduced segregation and stable quality can be fabricated.

In a preferred form, a binder assistant is added to the binder before the secondary mixing so that the binder is swollen. Since the binder is previously swollen, the binder can easily be fibrillated. Consequently, the swollen binder enhances entanglement of the carbonaceous powder and conductive assistant, and accordingly, the mixing can be carried out further desirably.

Activated carbon is primarily used as the carbonaceous powder. However, a carbon nanotube, fibrous carbon, etc. may be used instead. Carbon black is primarily used as the conductive assistant. A fluorocarbon resin such as polytetrafluoroethylene (PTFE) is preferable as the binder. The binder assistant includes alcohol such as isopropyl alcohol (IPA), ethanol, methanol, etc., ether, ketone, and the like.

BRIEF DESCRIPTION OF THE DRAWINGS

Other objects, features and advantages of the present invention will become clear upon reviewing the following description of the embodiment, made with reference to the accompanying drawings, in which:

FIGS. 2A and 2B are microphotographs of the mixture after primary and secondary mixing respectively;

FIG. 3 is a side view of the kneader;

DETAILED DESCRIPTION OF THE INVENTION

Figure 1:
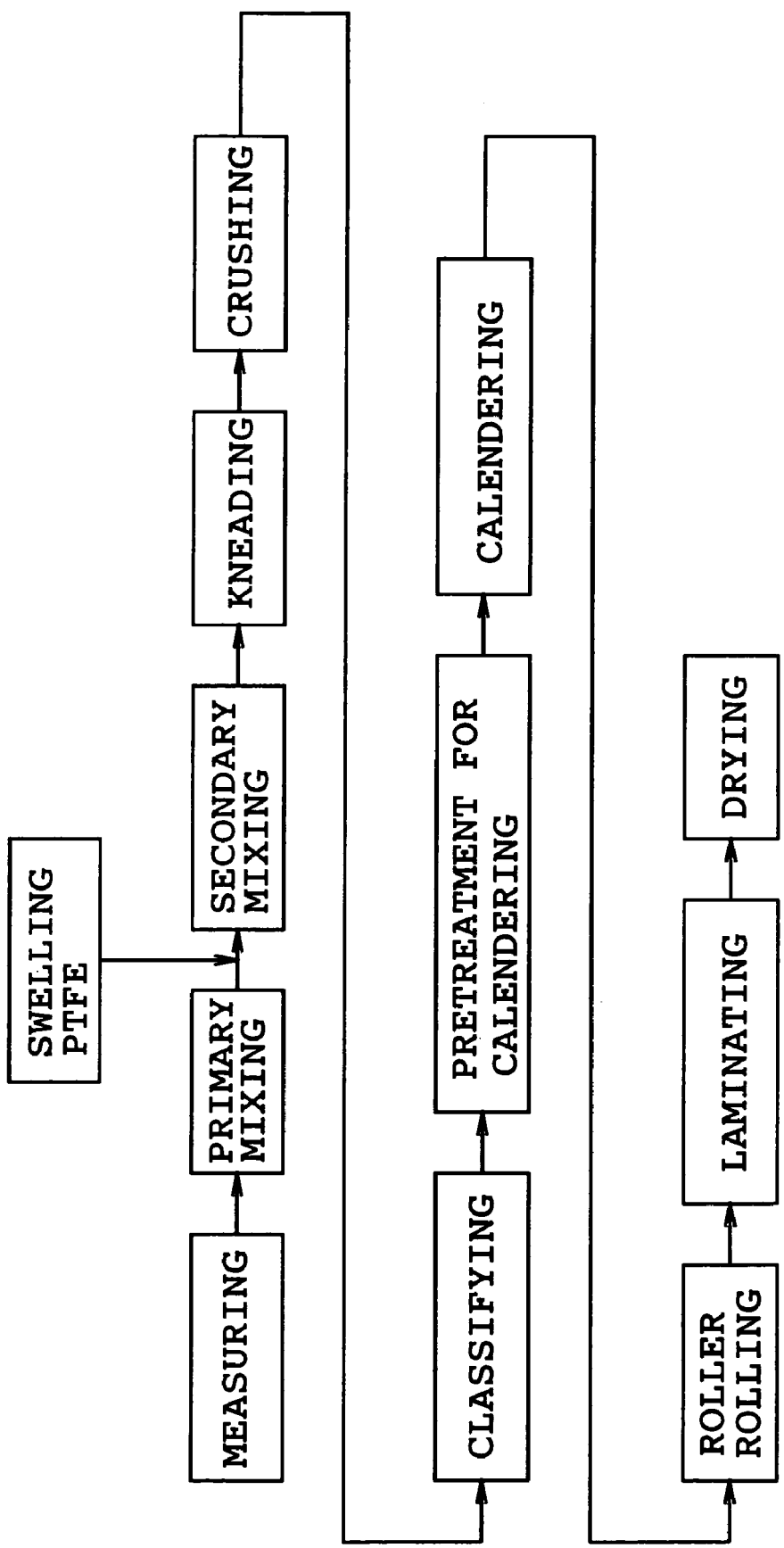
FIG. 1 schematically illustrates an overall process of manufacturing an electrode sheet for electric double layer capacitor in accordance with an embodiment of the present invention.

An embodiment of the present invention will be described with reference to the drawings. Referring to FIG. 1, a process of manufacturing a sheet electrode for an electric double layer capacitor is schematically shown. Materials used in manufacture of a polarizable electrode include activated carbon as the carbonaceous powder, carbon black as the conductive assistant, PTFE powder as the binder, and liquid IPA as the binder assistant. The activated carbon, carbon black and PTFE are in the ratio of, by mass %, 80:10:10 in their solid state. IPA whose amount is 10% by mass and is equal to PTFE is added.

Firstly, the materials are each measured. Subsequently, a primary mixing is carried out. In the primary mixing, activated carbon and carbon black are put into a container of a mixer and mixed together by rotating an agitating blade. As a result, the activated carbon and carbon black are mixed as uniformly as possible. The resultant mixture is referred to as "primary mixture." In FIG. 2A showing the primary mixture, reference numeral 1 designates larger masses of activated carbon, whereas reference numeral 2 designates smaller masses of carbon black.

PTFE and IPA are previously mixed so that PTFE swollen by IPA is put into the container of the mixer thereby to be mixed with the primary mixture. This mixing is referred to as "secondary mixing." Consequently, activated carbon 1, carbon black 2 and PTFE 3 are mixed together, and PTFE 3 is fibrillated such that activated carbon 1 and carbon black 2 are entangled with each other.

Subsequently, the secondary mixture is then accommodated in a container 5 of a kneader 4 as shown in FIG. 3. A cover 6 is attached to the kneader 4 and blades 7 are rotated while an atmosphere in the container 5 is pressurized, whereby kneading is carried out. A plurality of temperature sensors 8 are provided on the container 5. The container 5 and the cover 6 are provided with heaters 9 respectively. The kneader 4 is constructed so that a cooling medium such as water is circulated through the container 5, the cover 6 and the blades 7.

A control device (not shown) is provided in the kneader 4. Based on temperatures detected by the temperature sensors 8, the control device controls the kneader 4 so that the heaters 9 are energized and deenergized and so that the cooling medium is circulated through the container 5, the cover 6 and the blades 7 all of which are brought into contact with the mixture (kneaded material), whereby temperatures of the container 5, the cover 6 and the blades 7 are controlled. In this case, the control device controls so that the temperatures of the container 5, the cover 6 and the blades 7 are maintained at 90° C., for example. When kneaded by the kneader 4 constructed as described above, the mixture is rendered clayey, and PTFE is further fibrillated such that activated carbon and carbon black are further entangled with each other.

Subsequently, the resultant material kneaded by the kneader 4 is accommodated in a container of a crushing machine so as to be crushed into fine grain by rotating a crushing blade. The crushed grain is then put through a sieve, thereby being classified. A grain diameter is controlled so as to be not more than 1.0 mm, for example. The grain obtained by the aforesaid crushing serves as a primary forming material.

Figure 4:
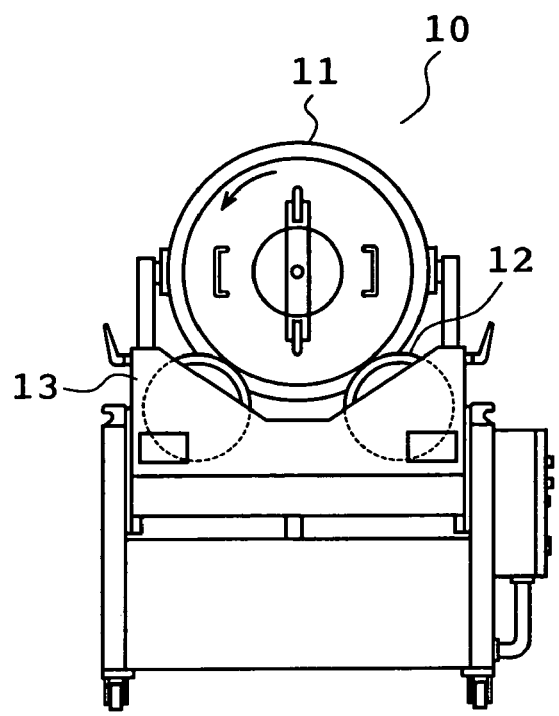
FIG. 4 is a sectional view of the mixer.

Thereafter, in a process previous to a calendering process, the aforesaid forming material is accommodated in a container 11 of a mixer as shown in FIG. 4. Furthermore, 70% IPA is added to the primary forming material relative to a total mass of the materials (activated carbon, carbon black and PTFE), thereby being mixed together. The container 11 of the mixer 10 is substantially cylindrical, and is rotated by rollers 12 and rocked vertically with a mount 13. As the result of mixing by the mixer 10, the granular primary forming material and liquid IPA both accommodated in the container 11 are mixed together as uniformly as possible.

In a subsequent calendering step, a mixture of the primary forming material and IPA mixed by the mixer 10 is put into a hopper of a calendering machine. The mixture is passed between two parallel rollers thereby to be formed into a sheet material (a secondary forming material). The formed sheet material is wound onto a take-up roller. The sheet material has a thickness of about 200 μm, for example.

In a subsequent roller rolling process, the sheet material obtained in the calendering process is rolled between two rollers. The roller rolling process is carried out at a plurality of times so that a sheet electrode with a predetermined thickness, for example, 160 μm, is made. The sheet electrode thus obtained serves as a polarizable electrode. Widthwise ends of the sheet electrode are cut by a cutter at a final step of the roller rolling.

Figure 5:
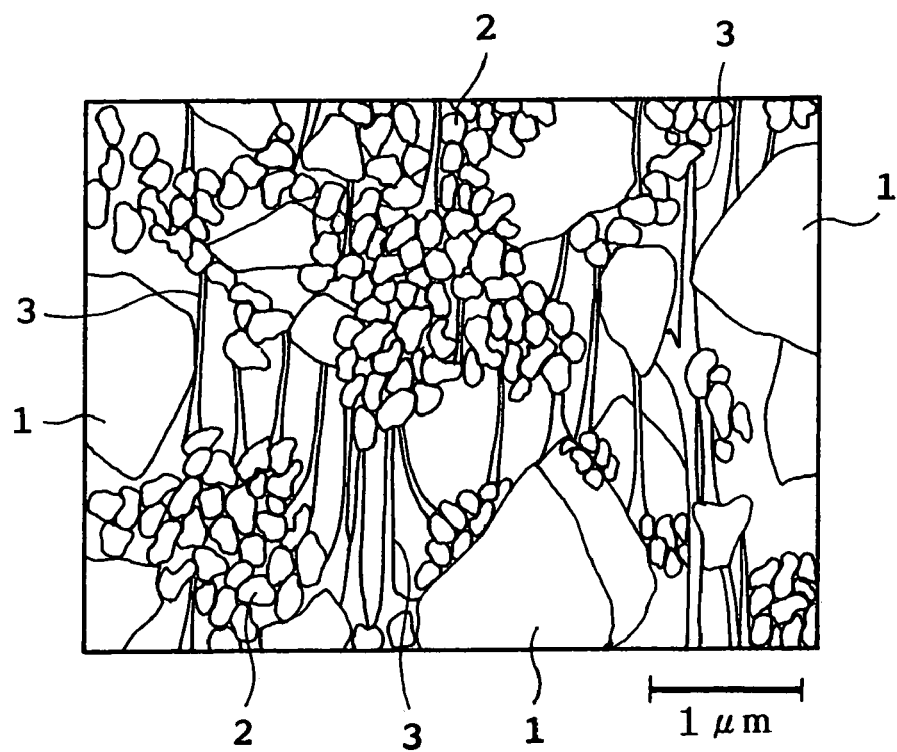
FIG. 5 is a microphotograph of the surface of a sheet electrode.

FIG. 5 is a microphotograph of the surface of a sheet electrode. It is obvious from FIG. 5 that the activated carbon 1 and the carbon black 2 smaller than the activated carbon are entangled with each other by the fibrillate PTFE 3.

Subsequently, in a laminating step, the rolled sheet electrode is applied to an aluminum foil serving as a collecting electrode. The electrode sheet thus applied to the aluminum foil is wound onto a take-up roller. Thereafter, in a drying step, the wound electrode sheet is drawn and passed through a drying chamber of the drying machine thereby to be dried. In the drying chamber, moisture content of the sheet electrode and remainder of IPA are eliminated by hot air produced by the heater. Vacuum drying may be carried out, if necessary. In the foregoing embodiment, the activated carbon 1 and carbon black 2 are firstly mixed together in the primary mixing. As the result of the primary mixing, the activated carbon 1 and carbon black 2 can be mixed together as uniformly as possible. Subsequently, PTFE 3 serving as the binder is added to the uniform mixture of activated carbon 1 and carbon black 2 in the second mixing. As a result, the materials can be mixed as uniformly as possible.

Moreover, in the secondary mixing, IPA serving as a binder assistant is previously added to PTFE 3 serving as the binder so that PTFE 3 is preferentially swollen. Accordingly, PTFE 3 is easy to fibrillate. Since the PTFE 3 easy to fibrillate is added to the primary mixture of activated carbon and carbon black to be mixed together, the activated carbon and carbon black become easy to be entangled with each other. Consequently, the materials can be mixed together further desirably.

Thus, the carbonaceous powder (activated carbon 1) and the conductive assistant (carbon black 2) are previously mixed together. Furthermore, the binder which is swollen and accordingly easy to fibrillate is added to the carbonaceous powder and the conductive assistant to be mixed together. Accordingly, since the carbonaceous powder, the conductive assistant and the binder are distributed as uniformly as possible, these materials are mixed desirably. Consequently, failure in the mixing of the materials can be prevented as much as possible. Since the mixing is carried out successfully in the mixing step, the subsequent kneading, forming and rolling can easily be carried out. Consequently, a sheet polarizable electrode with reduced segregation and stable quality can be fabricated.

When an amount of IPA to be added is excessively small in the above-described mixing step, PTFE is hard to fibrillate in the mixing of materials and accordingly, the mixing and kneading cannot be carried out successfully. On the other hand, when an amount of IPA to be added is excessively large, a drying step is required to eliminate a remainder of IPA before forming. Accordingly, an amount of IPA to be added to PTFE in the mixing of the materials preferably ranges from 70 to 130% of mass of PTFE (binder) to be added.

Furthermore, IPA is added both in the mixing of materials and immediately before forming into a sheet shape (the process prior to the calendering process). Consequently, no drying step to remove IPA is required before forming since an amount of IPA is small enough to swell PTFE. Furthermore, since IPA is added and mixed immediately before the forming step, evaporation of IPA during the forming need not be taken into consideration. Consequently, an amount of IPA and the product quality can further be stabilized.

Figure 6:
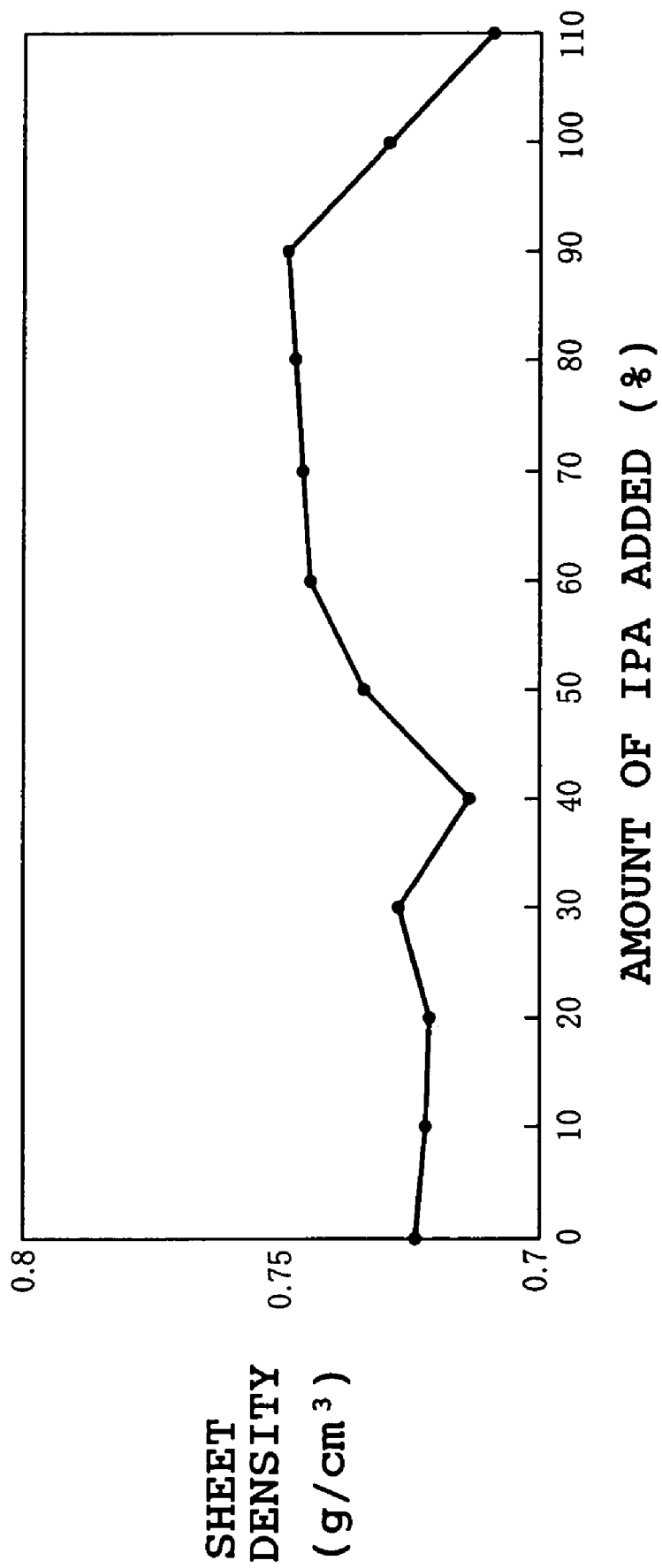
FIG. 6 is a graph showing the relationship between an amount of IPA added in a process before calendaring and the sheet density of the formed sheet after calendering.

FIG. 6 shows experimental results of the relationship between an amount of IPA added in the process at the second time of addition immediately before the calendaring (a ratio to a total mass of the materials except IPA (activated carbon, carbon black and PTFE) in the mixing of materials) and the sheet density of the formed sheet material after the calendering. An amount of IPA added in the first time of addition (in the mixing of materials) is 10% and is equal to a mass of PTFE. As obvious from FIG. 6, the sheet density is small when an amount of IPA added is less than 50% or particularly at 40%. Furthermore, the sheet density is also small when an amount of IPA added is at 110%. Reduction in the sheet density is considered to result from the presence of a cavity inside a formed sheet material. The strength of the formed sheet material becomes lower as the sheet density is small.

A cavity inside a formed sheet material tends to result in defect even after subsequent steps. The sheet density is rapidly increased when an amount of IPA added ranges from 110% to 100%. The sheet density is considered to be stable particularly when being not more than 100%. As obvious from the results of FIG. 6, the sheet density is stably high when an amount of IPA added in a process prior to the calendering ranges from 50% to 100%. Accordingly, regarding an amount of IPA added in a process prior to the calendering, it is preferable that a total mass of activated carbon (carbonaceous powder), carbon black (conductive assistant) and PTFE (binder) ranges from 50% to 100%.

IPA is added to the primary forming material contained in the container 11 of the mixer 10. Since the container 11 is closed, IPA is prevented from volatilizing thereby to get out of the container. Furthermore, since IPA and the primary forming material are mixed together sufficiently in the container 11, the quality of the primary forming material used in the calendering can be stabilized and accordingly, a more desirable sheet polarizable electrode can be fabricated.

When the mixture obtained in the secondary mixing is kneaded by the kneader 4, the container 5, the cover 6 and the blades 7 are brought into contact with the mixture during the kneading operation. In this case, the temperatures of the container 5, the cover 6 and the blades 7 are controlled. Thus, since the mixture is kneaded under the same temperature conditions, the kneading can be carried out desirably. Furthermore, the binding property of the binder and the material uniformity can be improved, and accordingly, the strength and density of the sheet electrode can be stabilized.

When the above-described temperature control is not carried out in the kneading step, the temperatures of parts brought into contact with the material become higher than those at the time of start of the kneading since a frictional heat is generated upon start of the kneading. The temperatures are easy to rise particularly when the kneading is continuously carried out. The temperature of the mixture (kneaded material) varies under these conditions. Accordingly, the binding property of the binder is reduced such that the quality of the mixture (kneaded material) is rendered unstable. Furthermore, when the mixture (kneaded material) is made into a sheet shape, the strength of the sheet is reduced such that the sheet is broken. Furthermore, since densification of the sheet is prevented, the density of the sheet is sometimes reduced. However, the aforesaid deficiency can be overcome when the temperature control is carried out in the manner as described above.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A method of making a polarizable electrode for an electric double layer capacitor, comprising:
   a mixing step including a primary mixing in which a carbonaceous powder and a conductive assistant are mixed into a primary mixture, and a secondary mixing in which a binder and a binder assistant added to the binder before the secondary mixing so that the binder is swollen are added to the primary mixture so that the carbonaceous powder, the conductive assistant, the binder and the binder assistant are mixed into a material mixture;
   a kneading step in which the material mixture is kneaded into a clayey forming material;
   a forming step in which the clayey forming material is formed into fine grain thereafter into a sheet of forming material; and
   a rolling step in which the sheet of forming material is rolled into a thinner sheet shape.

2. A method according to claim 1, wherein the binder assistant is added to the clayey forming material and mixed immediately before the forming step of forming the fine grain forming material into the sheet of forming material.

3. A method according to claim 2, wherein an amount of the binder assistant added to the fine grain of forming material ranges from 50 to 100% of a sum total mass of the carbonaceous powder, the conductive assistant and the binder.

4. A method according to claim 2, wherein an amount of the binder assistant added to the binder in the mixing ranges from 70 to 130% of a mass of the binder, and an amount of the binder assistant added to the fine grain of forming material ranges from 50 to 100% of a sum total mass of the carbonaceous powder, the conductive assistant and the binder.

5. A method according to claim 2, wherein the fine grain of forming material added with the binder assistant is mixed in a closed container.

6. A method according to claim 1, wherein an amount of the binder assistant added to the binder in the mixing ranges from 70 to 130% of a mass of the binder.

7. A method according to claim 1, wherein the material mixture is kneaded by a kneader, and the kneader includes a portion with which the material mixture is brought into contact during the kneading, and the material mixture is kneaded while a temperature of the portion of the kneader is controlled.

* * * * *